(12) United States Patent
Chen (10) Patent No.: US 8,424,160 B2
(45) Date of Patent: Apr. 23, 2013

(54) ASYMMETRICAL RESISTANT HINGE SET

(75) Inventor: Stephen Chen, Changhua (TW)

(73) Assignee: E-Lead Electronics Co., Ltd., Changhua (TW)

( * ) Notice: Subject to any disclaimer, the term of this patent is extended or adjusted under 35 U.S.C. 154(b) by 393 days.

(21) Appl. No.: 12/854,290

(22) Filed: Aug. 11, 2010

(65) Prior Publication Data

US 2012/0036679 A1    Feb. 16, 2012

(51) Int. Cl.
*E05F 1/08* (2006.01)

(52) U.S. Cl.
USPC .................. 16/278; 16/280; 16/285; 16/295; 16/308; 16/312

(58) Field of Classification Search .............. 16/75, 277, 16/278, 280, 284, 285, 295, 297, 303, 308, 16/312
See application file for complete search history.

(56) References Cited

U.S. PATENT DOCUMENTS

| | | | |
|---|---|---|---|
| 5,037,231 A * | 8/1991 | Kitamura | 403/120 |
| 5,109,571 A * | 5/1992 | Ohshima et al. | 16/307 |
| 6,070,298 A * | 6/2000 | Sorimachi | 16/330 |
| 6,647,593 B2 * | 11/2003 | Iguchi et al. | 16/386 |
| 6,886,221 B2 * | 5/2005 | Minami et al. | 16/324 |
| 6,952,860 B2 * | 10/2005 | Kawamoto | 16/285 |
| 7,117,562 B2 * | 10/2006 | Zuo et al. | 16/303 |
| 7,334,297 B2 * | 2/2008 | Ma et al. | 16/348 |
| 7,434,296 B2 * | 10/2008 | Kubota | 16/330 |
| 2006/0200945 A1 * | 9/2006 | Lu et al. | 16/340 |
| 2008/0155784 A1 * | 7/2008 | Hsu et al. | 16/303 |

* cited by examiner

*Primary Examiner* — Roberta Delisle (74) *Attorney, Agent, or Firm* — Rosenberg, Klein & Lee (57) ABSTRACT

An asymmetrical resistant hinge set includes at least a resistant hinge and an elastic element coaxially positioned. The resistant hinge is hinged on a first pivotal means located on the bottom side of a body. The elastic element provides action forces on the resistant hinge and one-way resistance to generate an asymmetrical hinge effect with a greater resistance in one direction and a smaller resistance in another direction when a support lid is flipped in forward and reverse directions to reduce the resistance of the resistant hinge. As a result, when the support lid is flipped to a selected angle it still can bear the weight of the body of a portable electronic device at the anchored position without drifting.

4 Claims, 10 Drawing Sheets

ASYMMETRICAL RESISTANT HINGE SET

BACKGROUND OF THE INVENTION

1. Field of the Invention

The present invention relates to an asymmetrical resistant hinge set and particularly to an asymmetrical hinge set adopted for use on a support rack of portable electronic devices to anchor on a selected flipping angle without drifting.

2. Description of the Prior Art

Figure 1:
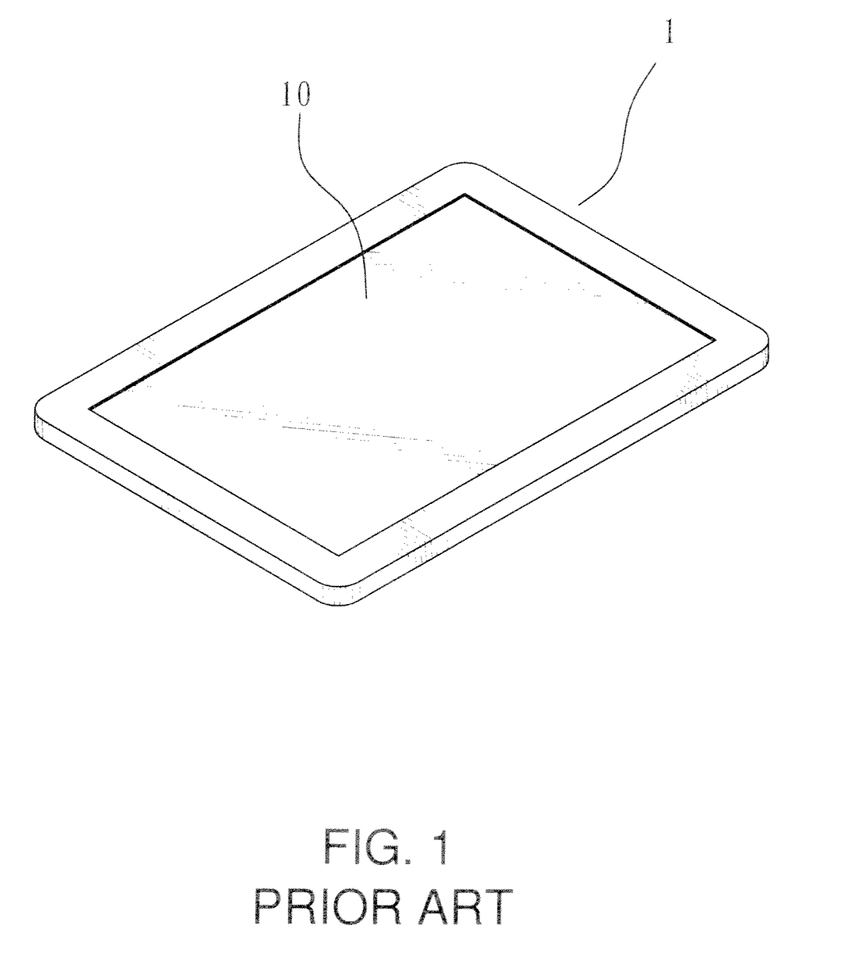
FIG. 1 is a perspective view of a support rack for a conventional portable electronic device.

Progress of computers has evolved from housed in a machine room to personal and notebook computers, and now to become touch control portable electronic device 1 (referring to FIG. 1) such as smart phones, tablet computers or the like. Users can directly and intuitively tap a computer screen 10 to select desired items, and splay or narrow two or more fingers to zoom graphics or texts on the screen larger or smaller. Such an operation approach shortens the distance between a user and screen 10 and is much user-friendly than the conventional computer which is operated through a keyboard interposed between the user and screen. The portable electronic device 1, with one set of touch screen as an operation interface, allows users to move freely on the screen 10 when in use. Usability improves greatly.

When a larger portable electronic device 1, such as a tablet computer, in use a user has to hold the computer with one hand and operate with another hand; even if it is rested on a desk or user's lap user still has to hold the display screen in an upright position with a palm at an optimal viewing angle. It's troublesome and easily causes fatigue on user's arm when used in a prolonged duration.

Figure 2:
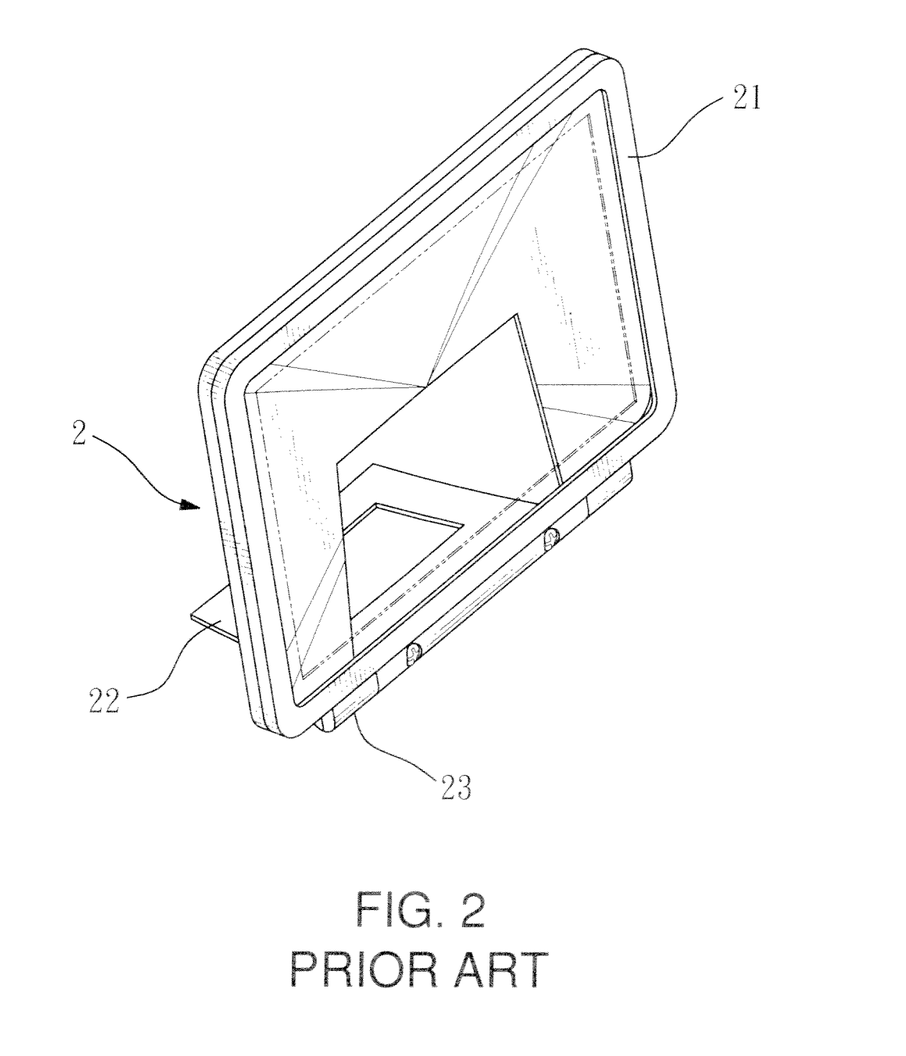
FIG. 2 is a perspective view of another conventional support rack submitted by Applicant in Taiwan patent No. 99205897.
Figure 3:
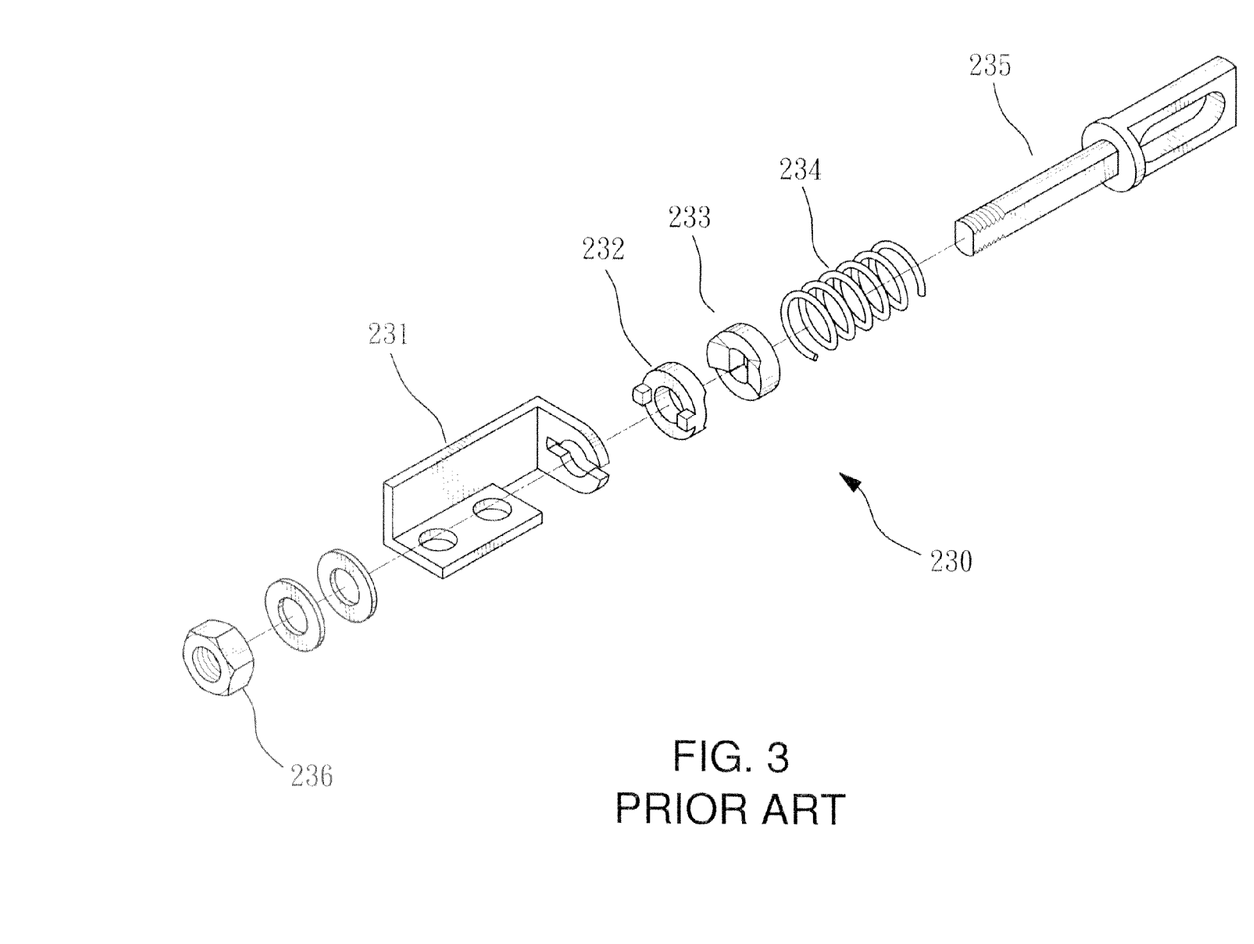
FIG. 3 is an exploded view of the hinge according to FIG. 2.

To remedy the aforesaid disadvantage, Applicant has proposed a support rack 2 for portable electronic devices (Taiwan patent No. 99205897, referring to FIGS. 2 and 3). It comprises a bumper 21, a support lid 22 and a hinge set 23. The hinge set 23 consists of two hinges 230. Each hinge 230 comprises an anchor seat 231, an anchor slider 232, a moving slider 233, a spring 234, a pintle 235 and a nut 236. The structure formed by the aforesaid elements can resolve the conventional problem. However it still has room for improvement. As the electronic device braced by the support rack, after coupling with the screen and circuitry, becomes heavier and is subject to a greater gravitational force, especially when the inclined angle is smaller approaching to the horizontal position. The hinge set 23 has to bear a heavier load. On the other hand, the electronic device equipped with the touch screen offers most smooth virtual keyboard entry operation when the inclined angle approximates to the horizontal position. But the spring 234 of the hinge set 23 does not have an adequate elastic force to bear the load, hence the support angle tends to drift. Choosing the spring or an elastic reed of a greater elastic force increases the resistance of the hinge 230 and a greater force is needed to flip the support lid 22, flipping operation is more difficult.

SUMMARY OF THE INVENTION

In view of the aforesaid problems, the present invention aims to provide an asymmetrical resistant hinge set that can maintain an anchored position without drifting. To achieve the foregoing object the hinge set according to the invention includes at least a resistant hinge and an elastic element coaxially positioned. The resistant hinge is hinged on a first pivotal means located on the bottom side of a body. The elastic element provides action forces and one-way resistance on the resistant hinge to generate an asymmetrical hinge effect with a greater resistance in one direction and a smaller resistance in another direction when a support lid is flipped in a forward and reverse directions to reduce the resistance of the resistant hinge. As a result, when the support lid is flipped to a selected angle it still can bear the weight of the body of a portable electronic device at the anchored position without drifting.

The resistant hinge of the invention comprises an anchor seat, an anchor slider, a moving slider, a spring, a pintle, a pintle sleeve and a nut. The pintle sleeve has a coupling portion at one end to hold the elastic element and a latch slot latched by a first leg of the elastic element.

The elastic element includes at least one elastic member, and can be a torsional spring or reed.

The foregoing, as well as additional objects, features and advantages of the invention will be more readily apparent from the following detailed description, which proceeds with reference to the accompanying drawings.

DESCRIPTION OF THE PREFERRED EMBODIMENTS

Please referring to FIGS. 4 through 7, the present invention aims to provide a hinge set 5 which comprises at least a resistant hinge 50 and an elastic element 58 positioned coaxially. The resistant hinge 50 is hinged on a first pivotal means 33 located on the bottom side of a body 3 and a second pivotal means 41 located on the bottom side of a support lid 4. The elastic element 58 provides action forces and one-way resistance on the resistant hinge 50 such that a greater resistance is generated in one direction and a smaller resistance is generated in another direction when the support lid 4 is flipped in a forward direction and reverse direction so that an asymmetrical hinge effect is produced.

Figure 4:
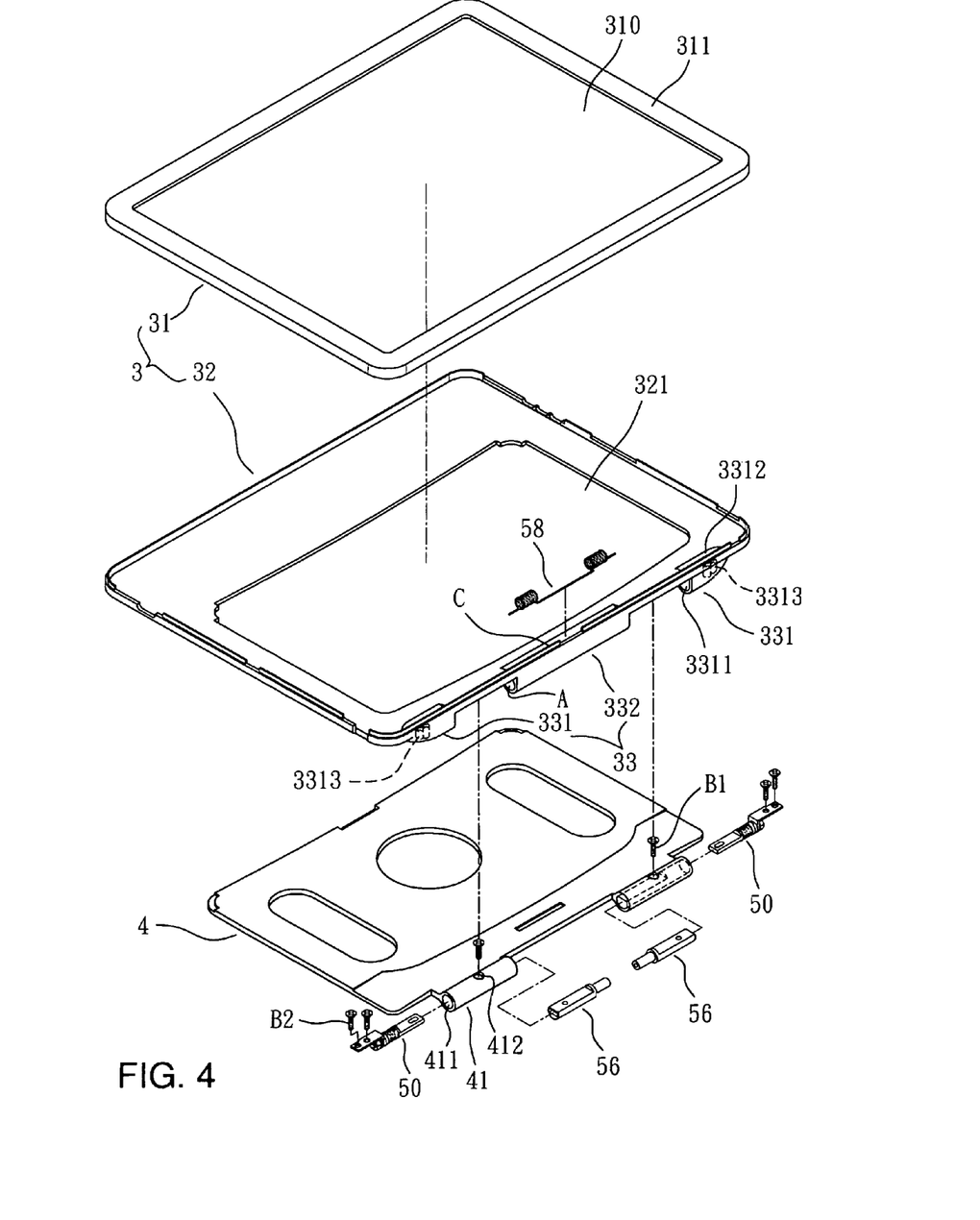
FIG. 4 is an exploded view of an embodiment of the invention.
Figure 5:
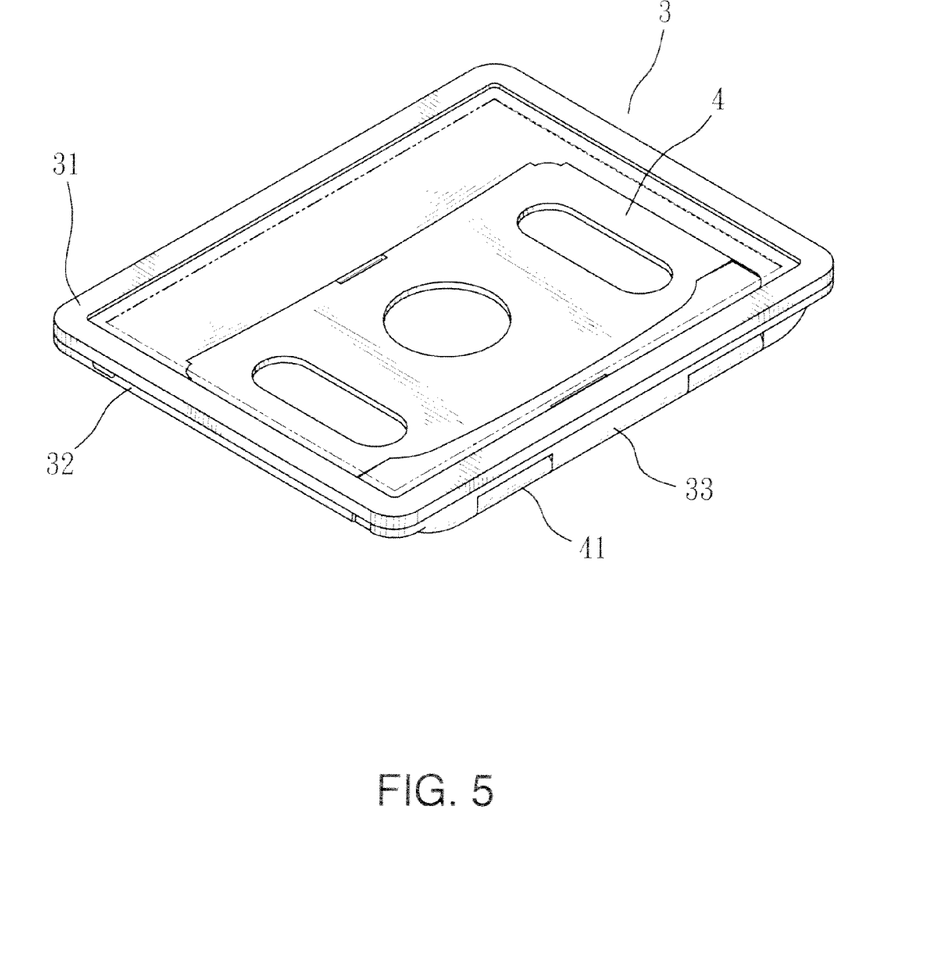
FIG. 5 is a perspective view of an embodiment of the invention.

The body 3 consists of an upper half portion 31 and a lower half portion 32 that are coupled together to hold and encase the chassis of an electronic device (such a structure is known in the art, thus details are omitted herein). The upper half portion 31 includes a frame 311 and a view window opening 310. The body 3 can hold and encase the chassis of a portable electronic device. The lower half portion 32 covers the back side of the electronic device and has a holding opening 321. The first pivotal means 33 at the bottom side of the body 3 includes at least a first pintle holder 331 and a second pintle holder 332. The first pintle holder 331 has an end opening 3311 and a flat deck 3312 and a screw hole 3313 at one edge. The second pintle holder 332 has a slot C on a lateral side leading to end openings A at two sides.

The second pivotal means 41 at the bottom side of the support lid 4 has a hinge hole 411 and a screw hole 412 at one side fastenable by a bolt B1.

Figure 6:
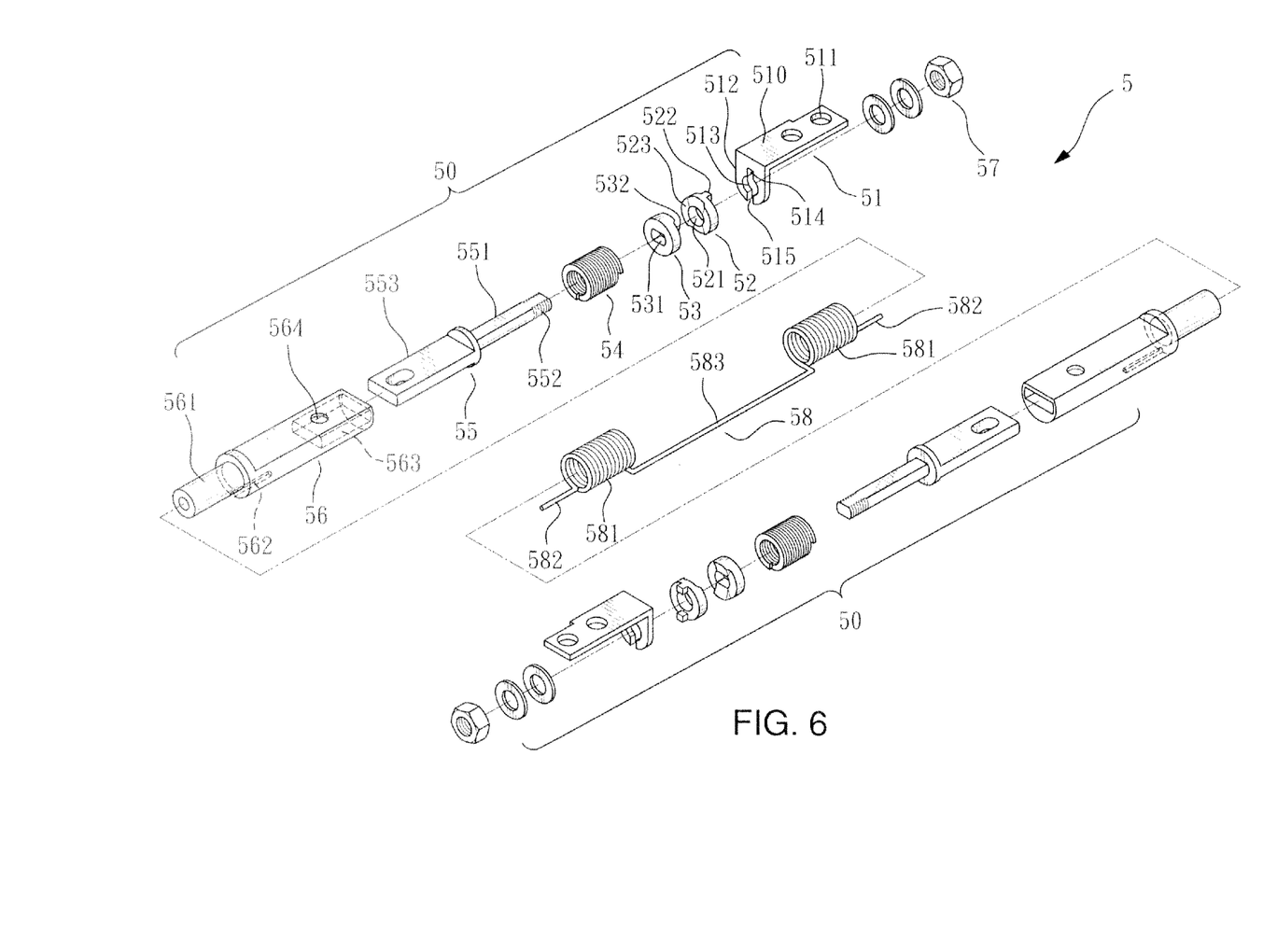
FIG. 6 is an exploded view of the hinge set of the invention.
Figure 7:
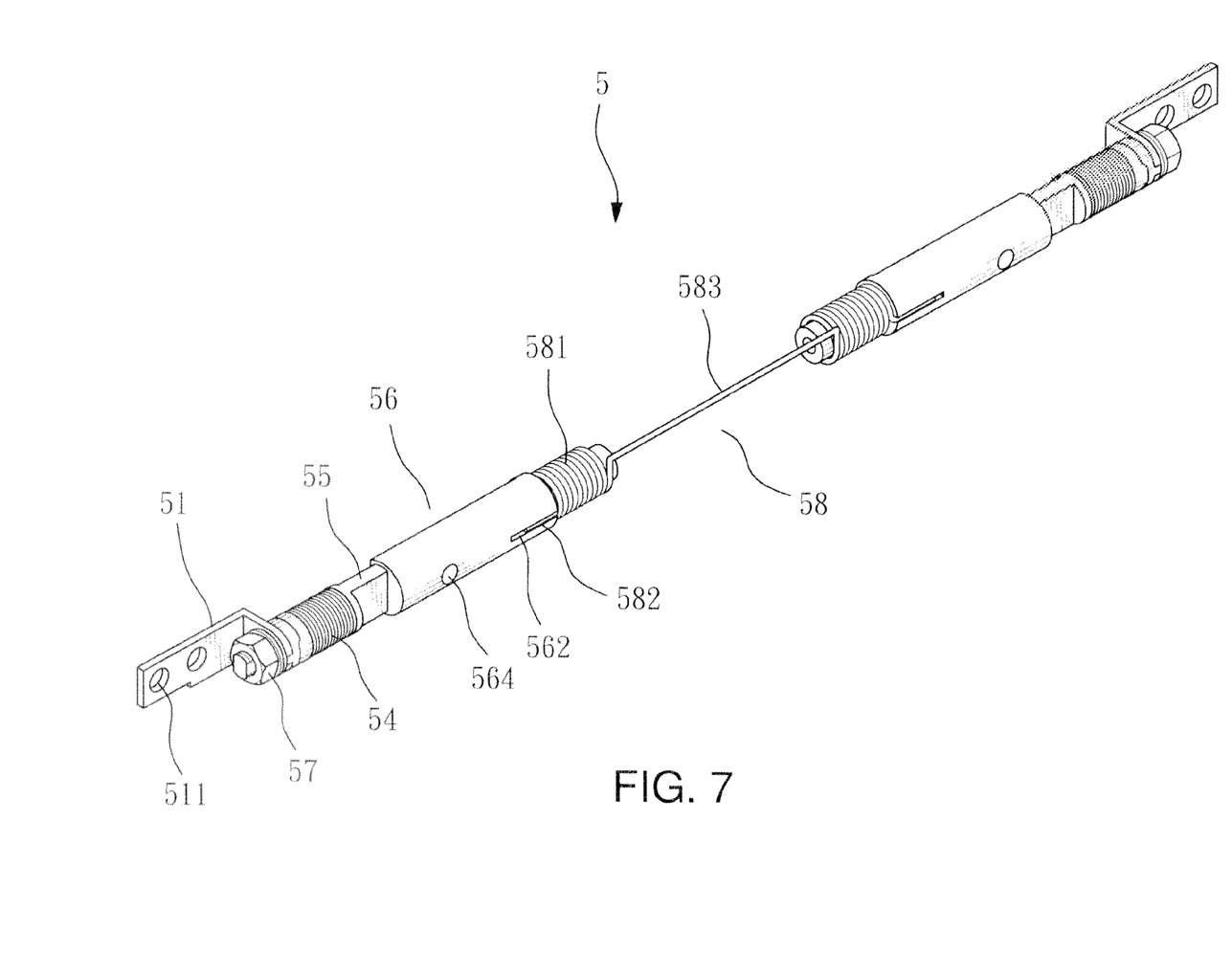
FIG. 7 is a perspective view of the hinge set of the invention.

The resistant hinge 50 includes an anchor seat 51, an anchor slider 52, a moving slider 53, a spring 54, a pintle 55, a pintle sleeve 56 and a nut 57.

The anchor seat 51 includes a plate 510 and a side plate 512 extended from a lower edge thereof. The side plate 512 has a pin hole 513 which has one side extended to form a vertical trough 514 and another side formed a vertical notch 515. The plate 510 has at least one aperture 511 formed thereon.

The anchor slider 52 has an aperture 521 and two opposing lugs 522 at one side to wedge in the vertical trough 514 and vertical notch 515, and an undulate first contact surface 523 on another side.

The moving slider 53 has an aperture 531 and an undulate second contact surface 532 at one side mating the first contact surface 523 to form contact therewith.

The spring 54 has one end butting the moving slider 53 and another end butting the pintle 55.

The pintle 55 has a stem 551 at one side with a threaded section 552 formed on a distal end fastenable with the nut 57 and a fastening end 553 at another side. The stem 551 holds, in this order, the spring 54, moving slider 53, anchor slider 52 and anchor seat 51 and is fastened by the nut 57.

Figure 9:
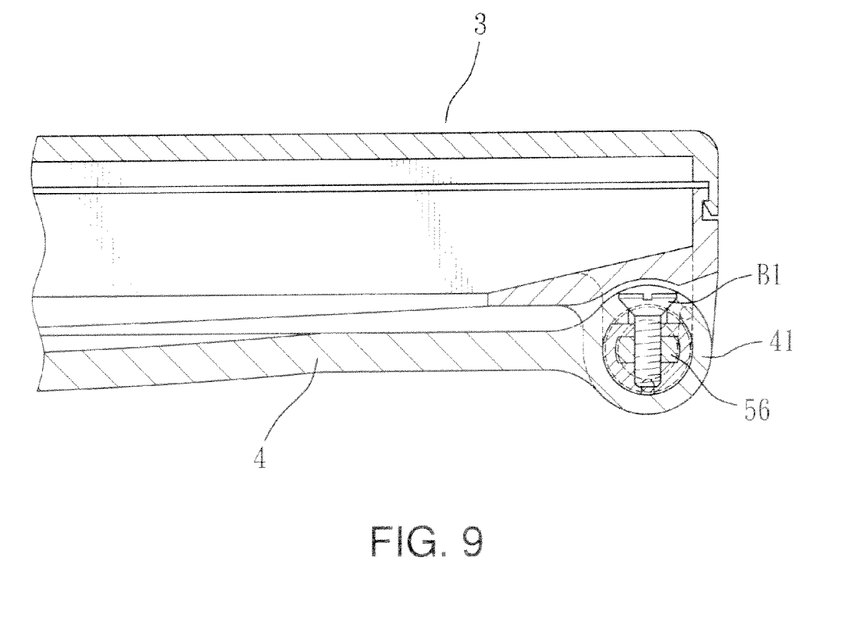
FIG. 9 is another fragmentary sectional view of the invention.

The pintle sleeve 56 has a coupling portion 561 at one end to hold the elastic element 58 and a latch slot 562 adjacent to the coupling portion 561, and an insertion trough 563 at another side to receive the fastening end 553 of the stem 55. The insertion trough 563 has one side with a fastening hole 564 formed thereon fastenable by the bolt B1 (referring to FIGS. 4, 6 and 9).

The elastic element 58 (referring to FIGS. 6 and 7) includes at least one elastic member 581 and has a first leg 582 at one end wedged in the latch slot 562 and a second leg 583 at another end latched on the coupling portion 561 of the pintle sleeve 56. Preferably two elastic members 581 are provided for the elastic element 58 on the left side and right side corresponding to each other with two second legs 583 joined on a straight line so that two resistant hinges 50 are provided to offer improved elastic balance effect in use. The elastic element 58 can be a torsional spring or reed.

Figure 8:
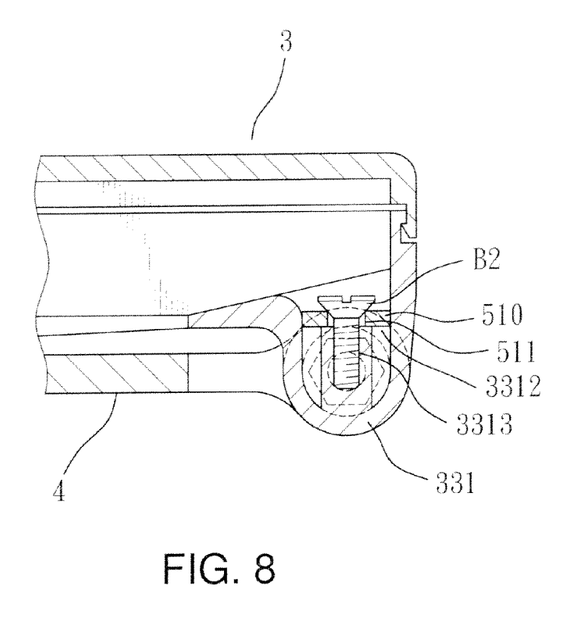
FIG. 8 is a fragmentary sectional view of the invention.

Assembly is performed in this order, mount the spring 54, moving slider 53, anchor slider 52 and anchor seat 51 on the stem 551 of the pintle 55, then fasten through the nut 57; insert the fastening head 553 of the pintle 55 into the hinge hole 411 of the second pivotal means 41; insert the pintle sleeve 56 from another end of the hinge hole 411, wedge the fastening end 553 in the insertion trough 563; dispose the elastic member 581 at two ends in the slot C of the second pintle holder 332 to run through the coupling portion 561 of the pintle sleeve 56; position the plate 510 of the anchor seat 56 on the flat deck 3312 of the first pintle holder 331; place the nut 57 in the end opening 3311 of the first pintle holder 331; fasten a bolt B2 in the screw hole 3313 through the aperture 511 (referring to FIG. 8).

Figure 10:
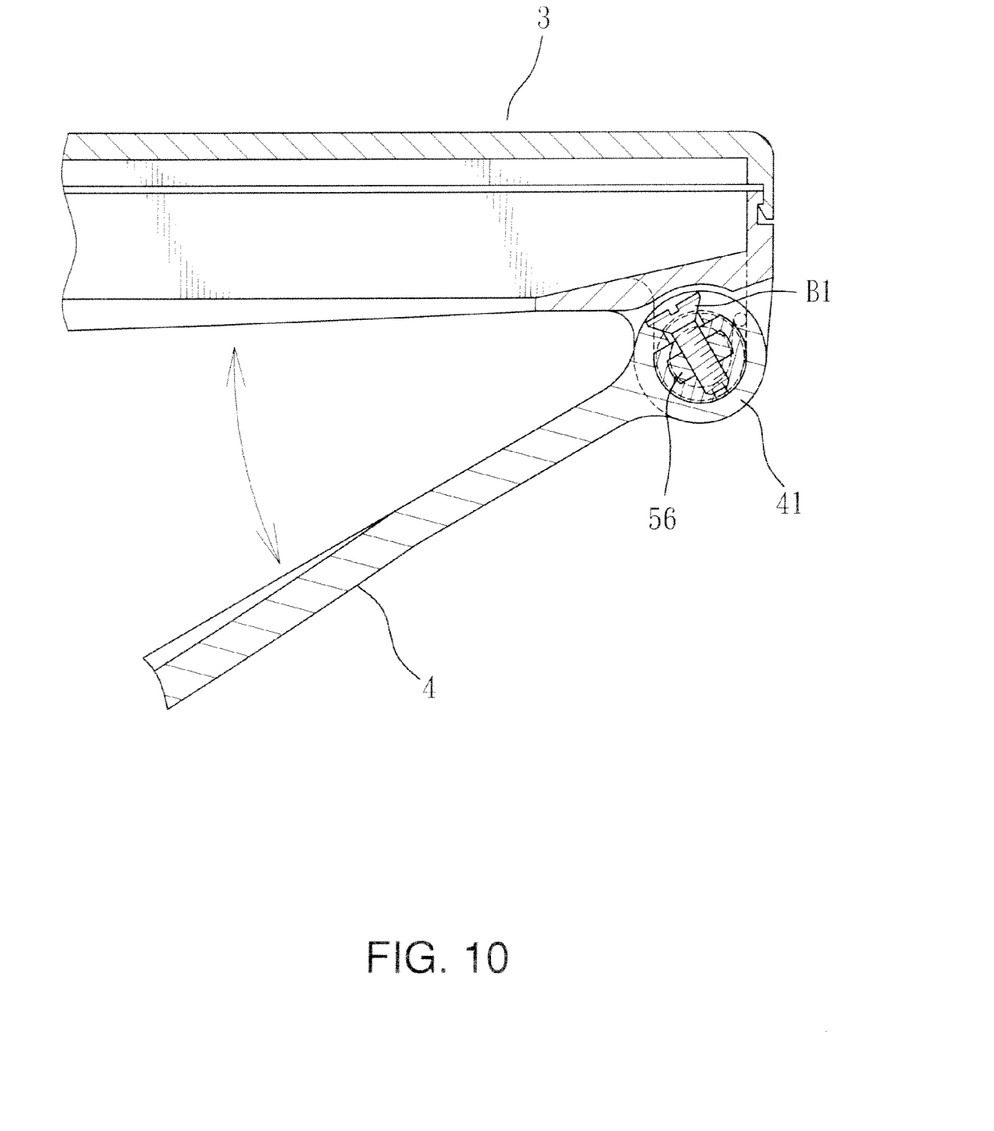
FIG. 10 is a schematic view of the invention in an operating condition.
Figure 11:
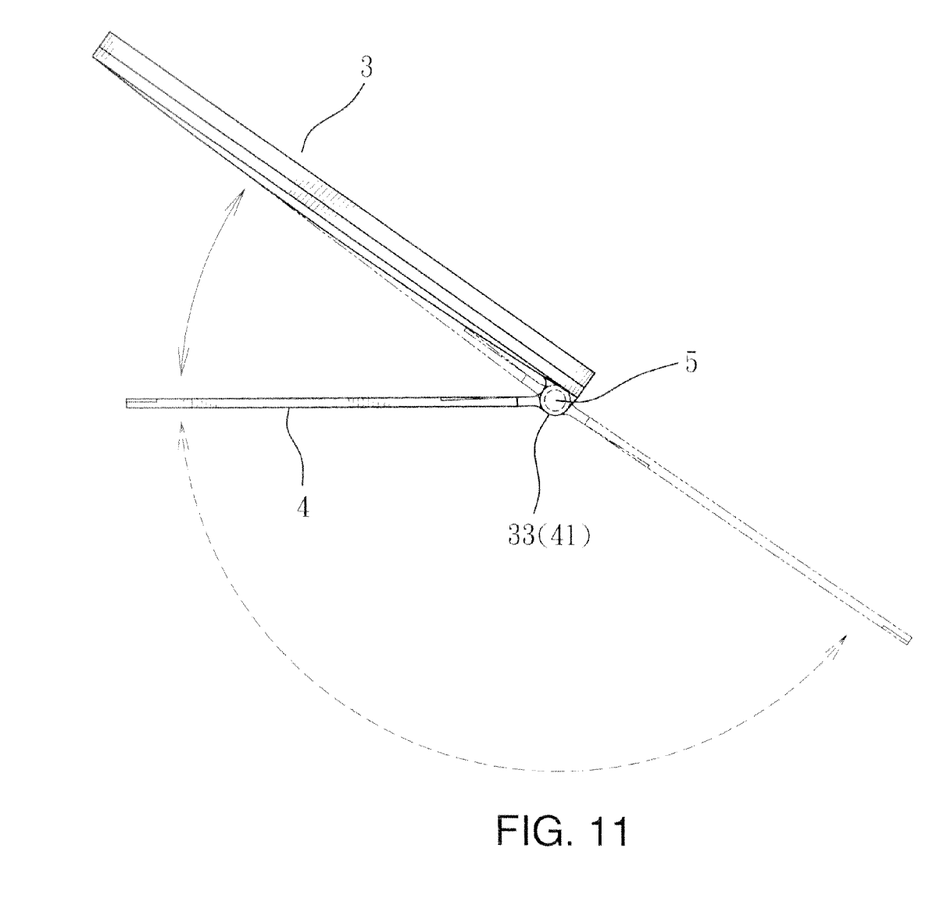
FIG. 11 is a schematic view of the invention in another operating condition.

The structure thus formed can support the support lid 4 to flip forwards and backwards as desired (referring to FIGS. 10 and 11). Due to the moving slider 53 of the resistant hinge 50 is butted by the spring 54, and the undulate second contact surface 532 of the moving slider 53 is tightly in contact with the undulate first contact surface 523 of the anchor slider 52, the spring 54 provides a compression elastic force greater than the weight of the body 3 of the portable electronic device when external forces are absent, and can maintain the support lid 4 at whatever angles it is flipped without drifting. When the support lid 4 is turned closer to the body 3 (i.e. the inclined angle approximates to horizontal) the action force of the elastic element 58 is smaller, the spring 54 alone can provide a butting force to bear the weight of the body 3 of the portable electronic device. In other words, the hinge 5 can provide asymmetrical resistant forces during flipping forwards and backwards to form desired anchoring without drifting. Hence when the support lid 4 is flipped away from the horizontal direction the torsional force of the elastic element 58 gradually increases to offset the butting force of the spring 54, hence the resistant force of the hinge set 5 decreases to make flipping easier, On the other hand, when flipping is closer to the horizontal position, the action force of the elastic element 58 is smaller and the offset butting force of the spring 54 also is smaller, hence it can bear more load of the body 3 of the portable electronic device. Therefore the support lid 4 can be flipped at a desired angle and anchored securely without drifting.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

I claim:

1. An asymmetrical resistant hinge set comprising at least one resistant hinge and an elastic element positioned coaxially; the resistant hinge being hinged on a first pivotal means located on a bottom side of a body, the elastic element providing an action force on the resistant hinge and a one-way resistant force so that a greater resistance is generated in one direction and a smaller resistance is generated in another direction when a support lid is flipped forwards and backwards to form an asymmetrical hinge effect to reduce resistance of the resistant hinge;

wherein the resistant hinge includes an anchor seat, an anchor slider, a moving slider, a spring, a pintle, a pintle sleeve and a nut, the pintle having a stem to hold the spring, moving slider, anchor slider and anchor seat in this order and being fastened by the nut; and the pintle sleeve includes a coupling portion at one end to hold the elastic element and a latch slot adjacent to the coupling portion wedged in by a first leg of the elastic element and an insertion trough at another side to hold a fastening end of the pintle.

2. The asymmetrical resistant hinge set of claim 1, wherein the elastic element is a torsional spring.

3. The asymmetrical resistant hinge set of claim 1, wherein the elastic element is a torsional reed.

4. The asymmetrical resistant hinge set of claim 1, wherein the elastic element includes at least one elastic member.

* * * * *